United States Patent [19]

Spiel

[11] Patent Number: 4,560,573
[45] Date of Patent: Dec. 24, 1985

[54] RYE FLAVORING

[75] Inventor: Albert Spiel, Yonkers, N.Y.

[73] Assignee: Nabisco Brands, Inc., Parsippany, N.J.

[21] Appl. No.: 493,090

[22] Filed: May 9, 1983

[51] Int. Cl.$^4$ .............................................. A23L 1/22
[52] U.S. Cl. .................................. 426/622; 426/555; 426/650; 426/549
[58] Field of Search ................ 426/555, 549, 650, 622

[56] References Cited

U.S. PATENT DOCUMENTS 4,393,084  7/1983  Pomper et al. ................. 426/555 X
4,404,227  9/1983  Pomper et al. ................. 426/555 X

OTHER PUBLICATIONS

Matz, Bakery Technology and Engineering, 2nd Ed, 1972, Avi: Westport, Conn., pp. 214–215.
Pyler, Baking Science & Technology, 1973, vol. II, Siebel Publ. Co., Chicago, pp. 778–793.

Primary Examiner—Joseph Golian
Attorney, Agent, or Firm—Richard Kornutik

[57] ABSTRACT

A lump free rye flavoring comprising approximately 40–90% by weight of rye flour, 4–15% liquid acid flavorings and 8–45% of dry flavorings by weight to yield 100% of the rye flour is made by premixing some or all the rye flour and dry flavorings; preblending the liquid acid flavorings; spraying the blended liquid acid flavorings into the dry components to form an aggregate; and optionally coarse grinding the aggregate through a $\frac{1}{8}$ inch screen while simultaneously dusting the ground aggregate with the remaining rye flour. The aggregate or ground aggregate is then permitted to set until a non-rubbery consistency results; and grinding the resultant composition into a powder and mixing the resultant composition to achieve uniform lump free rye flavoring. Use of the rye flavoring in a bread mix is also disclosed.

38 Claims, No Drawings

RYE FLAVORING

BACKGROUND OF THE INVENTION

1. Field of the Invention

The present invention relates to new rye flavoring compositions, and methods of preparation. Also disclosed is the use of the rye flavorings in bread mixes.

2. Description of the Prior Art

Rye flavoring is well known and is used in breads, biscuits, crackers and pastries. Rye flour doughs do not form an elastic gluten when mixed with water, for example, and are usually sticky and do not have useful gas-holding properties, which are necessary in making breads rise. Accordingly, wheat flour is usually flavored with rye flavoring to make rye breads, biscuits, crackers and pastries. Typically, rye flavorings are based upon the use of rye flour and various flavorings as a partial replacement for wheat flour.

SUMMARY OF THE INVENTION

Lump free rye flavorings comprising rye flour and flavorings are disclosed as an additive to wheat flour products to yield a rye flavored product. The rye flavorings comprise approximately 40-88% by weight of rye flour, 4-15% liquid acid flavorings and 8-45% of dry flavorings by weight to yield 100% of the rye flavoring. One method of production calls for premixing the dry components (the rye flour plus dry flavorings); separately mixing the liquid acid flavorings; spraying the blended liquid acid flavorings into the dry components, while further mixing to yield a lumpy composition; allowing the resulting composition to set until the rubbery pellets are hard; grinding the composition to a fine powder; and remixing the resulting composition to substantial uniformity. The second method of production calls for premixing 60-90% of the rye flour with the dry flavorings; separately mixing the liquid acid flavorings; spraying the blended liquid acid flavorings into the premix, while further mixing to yield a lumpy composition; grinding the composition through a ⅛ inch coarse screen, while simultaneously and proportionally adding the remaining 10-40% rye flour to dust the ground composition; allowing the dusted composition to set until the lumps or rubbery pellets are hard; grinding the composition into a fine powder; and remixing the fine powder to substantial uniformity.

The novel rye flavorings can be employed in a bread mix comprising: flour; from 1.5 to 3%, based on the weight of the mix, of leavening active dry yeast; and from 0.1 to 0.75%, based on the weight of the mix, of dough conditioners selected from the group consisting of calcium stearoyl-2-lactylate, sodium stearoyl-2-lactylate, and mixtures of these. The method of production calls for premixing the bread mix with rye flavoring; mixing the bread mix with water to form a dough; shaping the dough for baking; proofing the shaped units for about 30 to about 45 minutes; and baking. Typically, 3-15% rye flavoring is employed in the bread mix based on the total weight of the premix. Thus, the rye flavoring can be incorporated into a bread mix and packaged as a dry rye bread mix, or packaged separately for use whenever rye flavoring is desired.

DETAILED DESCRIPTION OF THE INVENTION

The rye flavoring compositions of the present invention comprise rye flour and flavorings. The rye flour is generally a medium grade. A strong rye flour is undesirable because the taste is overly strong and has a pungent odor. A light rye flour fails to yield sufficient taste and accordingly, only wheat flour in the final product can be detected. Conventionally, rye flour comprises 40-88% by weight of the rye flavoring.

The various flavors can be powdered or an acid liquid. Preferably, at least one of the acid flavorings will be an organic acid liquid, but mineral acid flavorings can also be used. Typically, acid liquid components comprise 4-15% by weight of the rye flavoring. Other dry flavorings in the form of powder, granules or crystals comprise 8-45% by weight of the rye flavoring. Conventional dry flavorings are exemplified by salt, caraway, dill, fennel, onion, anise, garlic, or malt extract, or the like, or any mixture of these. Dry flavorings which were developed comprise, based on the weight of the rye flavoring: about 0-40% salt, about 0-10% caraway, about 0-9% dill seed, about 0-2% fennel, about 0-2.5% onion powder and about 0-20% malt extract. Typical liquid acid flavorings are exemplified by lactic acid, phosphoric acid, acetic acid or propionic acid, or the like, or any mixture of these. Because organic acid flavors are generally more tart or sour than inorganic mineral acids, it is preferable to have at least one organic acid flavor (see Source Book of Flavors, AVI Publishing Co., Inc., 1981, page 315). A preferred liquid acid flavoring which was developed comprises, based on the weight of the rye flavoring: about 0.1-1% glacial acetic acid; about 2-10% of 80% lactic acid; about 2-8% of 85% phosphoric acid and about 0.1-4% propionic acid. The rye flour and flavorings constitute 100% of the rye flavoring. Optionally, a small amount of spice mix which essentially contains oils of caraway, dill and fennel can be added.

To avoid lumps in the final product, one of the present methods of making rye flavoring must be followed. In the first method, all the dry components are placed in a mixer at room temperature. Any conventional mixer may be used, such as a Hobart, ribbon or screw type mixer. The dry components are thoroughly mixed until a uniform composition results. Separately, the liquid acid flavorings are homogeneously mixed, and are sprayed into the dry components at room temperature. The spray is a fine dispersion achieved by high pressure spraying in the range of 30-40 psi, through micron nozzle apertures of approximately 800 microns in diameter. The mixer is operated during the spraying procedure achieving a substantially uniform dry mixture, however, rubbery pellets still exist. It has been shown that the addition of the mixed liquid acid flavorings to the dry components of the rye flavoring, at an extremely slow rate, e.g. dropwise, does not form rubbery pellets. It is believed that the liquid acid flavorings chemically react with the protein in the rye flour, which is a component of the rye flavoring. However, if the liquid acid flavorings are quickly dispersed into the dry components of the rye flavoring, insufficient time exists for the chemical reaction to take place. Thus, no rubbery pellets are formed. However, any large scale commercial process cannot be limited to dropwise addition of liquid acid flavorings. Large scale commercial processes must admix the liquid acid flavorings quick enough to be economically feasible. However, spray from the liquid acid flavorings contacts various surfaces of the mixing equipment, like the mixing bowl and paddle blade, thus forming trickles. Other trickles are formed by the atomized droplets contacting other atomized droplets shortly after being ejected from the spray nozzle. The trickles of liquid acid flavorings are not quickly dispersed into the dry components and sufficient time exists for the chemical reaction to take place causing the formation of rubbery pellets. Rubbery pellets are undesirable because a higher percentage of the liquid acid flavorings are concentrated in the pellets as opposed to the remaining powdery mixture. In a large scale operation, some of the rubbery pellets will be "fist" size. The use of a fist size lump in a typical 400 gram retail package is obviously undesirable. Consequently, it is most important to manufacture a substantially uniform large scale production rye flavoring.

Accordingly, after the liquid acid flavorings are sprayed into the dry components and mixed, the resulting composition is allowed to set at room temperature until the lumps or rubbery pellets harden sufficiently so as to be grindable. It is theorized that during this time the liquid acid flavorings equilibrate by more uniformly distributing themselves among the dry powders, which additional mixing does not achieve, thus causing the rubbery pellets to harden. It has been found that 8–24 hours is sufficient time for the mixture to equilibrate and harden. However, the size of the lumps generally determines the time necessary to achieve equilibration, with large lumps requiring more time. Very large lumps (beyond fist size) indicate insufficient mixing during the spraying procedure. Beyond 24 hours of equilibration time is economically unbeneficial.

Grinding at room temperature can be achieved by any conventional device, such as a hammer mill, to from about 20–100 mesh range (840–149 microns, respectively) and will not substantially agglomerate. The fineness of grinding is somewhat dependent upon its final use. If the rye flavoring is to be packaged individually, it can be ground as desired. If the rye flavoring is to be premixed with a bread mix, it should be ground to a size compatable with other ingredients in the bread mix such that segregation in the retail package does not occur.

Once the rye flavoring has been ground, it is mixed once again, at room temperature, to insure equal distribution of all ingredients. This is necessary because the rubbery pellets include a higher addition of liquid acid flavorings than the remaining powder. Once final mixing is achieved, the rye flavoring will not substantially agglomerate.

The second method calls for premixing 60–90% of the rye flour with the dry flavorings at room temperature in any conventional mixer, such as those previously mentioned. Separately, the liquid acid flavorings are homogeneously mixed, and are sprayed into the dry premixed components at room temperature. The spraying apparatus and the nozzle dispersion size are the same as disclosed previously, and the mixer is operated during spraying to achieve a substantially uniform dry mixture, even though rubbery pellets exist. The mixture is ground at room temperature through a ⅛ inch coarse screen to produce uniform size rubbery pellets. Consequently no "fist" size lumps result and a shorter drying time is usually achieved as compared to the first method. To prevent agglomeration and coalescing of the screen ground mixture, the remaining rye flour (10–40% of the total rye flour) is employed to simultaneously dust the mixture at room temperature during screen grinding. To accomplish this, the remaining rye flour is placed into a feeder and introduced into the grinder which dusts the screen ground mixture. Of course the remaining rye flour is proportionally fed into the grinder such that all the mixture is coated or dusted with the remaining rye flour. The turbulent action within the grinder facilitates uniformly coating or dusting the particles with the flour. The additional flour also acts as a water absorber and equilibrates the mixture much faster than the first method.

After dusting the mixture, it is permitted to set at room temperature until the lumps or rubbery pellets harden sufficiently so as to be finely ground (20–100 mesh range). Grinding and final mixing is accomplished as described previously.

To prepare a rye bread according to the invention, the bread mix will preferably comprise a blend of high gluten wheat flour and rye flour; from about 0.4 to about 0.6% sodium stearoyl-2-lactylate based on the weight of the mix; and the mix will further comprise a rye flavoring. In its more specific aspects the rye bread mix according to the invention will consist essentially of: a high gluten wheat flour or a blend of high gluten wheat flour and rye flour; from about 0–1% caraway; from about 0–0.5% dill; from about 0–0.5% fennel; and from about 0–0.01% onion; from about 0–2% malt extract, from about 0.2 to about 0.3% inactive dry yeast; from about 1.5 to about 2.5% non-fat dry milk; from about 1.0 to about 3.5% sodium chloride; from about 1.0 to about 2.5% sugar; from about 1.0 to about 2.0% granular shortening; from about 0 to about 2% dry malt extract; from about 0.4 to about 0.6% sodium stearoyl-2-lactylate; and from about 1.5 to about 3.0% quick-leavening active dry yeast; all percentages based on the weight of the mix. A preferred rye bread flavorant which we have developed for use in preparing a realistic high quality rye bread comprises based on the weight of the flavorant: rye flour, about 0 to about 9% dill seed, about 0 to about 10% caraway, about 0 to about 40% salt, about 0 to about 2% fennel, about 0 to about 2.5% onion powder, about 0–20% malt extract, about 0.1 to about 1% acetic acid, about 2 to about 10% lactic acid, about 2.0 to about 8% phosphoric acid, about 0.1 to about 0.4% propionic acid, and optionally a spice mix which essentially contains oils of caraway, dill or fennel, or a mixture of these.

EXAMPLE 1

A rye flavoring is made by uniformly premixing, at room temperature, the dry components comprising, by weight percent based on the total weight of the rye flavoring:

| | |
|---|---|
| 48.77% | Medium Rye Flour |
| 25.08% | Salt |
| 7.17% | Caraway |
| 6.02% | Dill |
| 1.00% | Fennel |
| 0.15% | Onion | and separately mixing, at room temperature, the liquid components comprising, by weight:

| | |
|---|---|
| 5.52% | 80% Lactic Acid |
| 5.52% | 85% Phosphoric Acid |
| 0.50% | Glacial acetic Acid |
| 0.27% | Propionic Acid |

The liquid acid flavorings comprise 11.81% by weight of the rye flavoring. When homogeneous, the liquid composition is sprayed at a pressure of about 35 psi, at room temperature through nozzle apertures of approximately 800 microns in diameter, into the dry components while further mixing.

The resulting composition is allowed to set and equilibrate overnight (approximately 16 hours), and is then ground through a hammer mill to pass through a 100 mesh screen. The ground product is mixed once again and then packaged for use in a bread mix.

EXAMPLE 2

The procedure of Example 1 is followed to prepare the rye flavoring. To prepare a rye bread, the following ingredients are employed:

| Ingredients | % Based on Total Wt. |
| --- | --- |
| Flour - High Gluten | 80.54 |
| Medium Rye Flour | 5.42 |
| Inactive Dry Yeast | 0.25 |
| Non-Fat Dry Milk | 1.85 |
| Sodium Chloride | 1.45 |
| Sucrose | 1.35 |
| Dry Malt Extract | 1.35 |
| Shortening | 1.35 |
| Sodium Stearoyl-2-lactylate | 0.49 |
| Ground Caraway | 0.27 |
| Dill | 0.12 |
| Quick-leavening Active Dry Yeast | 1.85 |
| Rye Flavoring | 3.69 |
| | 100.00% |

The rye bread comprises 406 grams of the ingredients. The quick-leavening active dry yeast is blended with the other dry ingredients in a bowl to which is added one cup (240 ml) of hot tap water. The water and the dry ingredients are stirred briskly until the dough becomes stiff and most of the flour has been mixed in. Then, with lightly floured hands, the dough is folded and turned in a bowl to pick up remaining flour mixture. The dough is then permitted to rest for 10 minutes. After mixing, a dough ball is formed and flattened to a dimension of 8 × 12 inches prior to rolling. The dough is then turned over and again flattened to a smooth sheet. Then, starting at the shorter side of the rectangle, the dough sheet is rolled up tightly into a cylindrical form in the manner of a jelly roll. The free edge, along the length of the roll, is then sealed by pinching to form a seam. The rolled dough is placed on a greased cookie sheet, shaped into a long oval and covered with a dish towel and placed in a warm draft free area (about 85° F.) for about 40 minutes to allow the dough to rise. Meantime, the oven is preheated to 400° F. After the 40 minute proofing period, the towel is removed and the top of the dough is cut with three diagonals and wetted with an egg white glaze. The dough is then baked at 400° F. for about 30–35 minutes until the crust is golden brown. The resultant rye bread shows excellent grain and crumb structure.

EXAMPLE 3

Another rye flavoring has 84.31% medium rye flour (all percentages are based upon total weight of the rye flavoring). It is made by uniformly premixing, at room temperature, approximately ¾ of the rye flour with the dry components which comprise:

| Caraway | 6.30% |
| --- | --- |
| Dill | 3.97% |
| Fennel | 0.27% |
| Onion | 0.06% | and separately mixing, at room temperature, the liquid components comprising:

| 2.38% | 80% Lactic Acid |
| --- | --- |
| 2.38% | 85% Phosphoric Acid |
| 0.21% | Glacial Acetic Acid |
| 0.12 | Propionic Acid |

The liquid acid flavorings comprise 5.09% by weight of rye flavoring. When homogeneous, the liquid composition is sprayed at a pressure of about 35 psi, at room temperature, through nozzle apertures of approximately 800 microns in diameter, into the premixed components while further mixing.

The mixture is ground, at room temperature, through a ⅛ inch coarse screen to produce uniform size rubbery pellets. During the grinding operation, the remaining ¼ of the rye flour is simultaneously and proportionally introduced into the grinder to dust the coarse ground material to prevent agglomeration.

The dusted material is permitted to set and equilibrate overnight (approximately 16 hours), and is then ground through a hammer mill to about a 100 mesh size. The ground product is mixed once again and then packaged for use in a bread mix.

EXAMPLE 4

The procedure of Example 3 is followed to prepare the rye flavoring. To prepare a rye bread, the following ingredients are employed:

| Ingredients | % Based on Total Weight |
| --- | --- |
| High Gluten Flour | 80.26 |
| Salt | 2.37 |
| Sugar | 1.35 |
| Shortening | 1.35 |
| Dry Malt Extract | 1.35 |
| Sodium Stearoyl-2-Lactylate | 0.49 |
| Inactive Dry Yeast | 0.23 |
| Non-Fat Dry Milk | 1.83 |
| Quick-Leavening Active Dry Yeast | 2.23 |
| Rye Flavoring | 8.54 |
| | 100.00 |

The rye bread comprises 410 grams of the ingredients. The quick-leavening active dry yeast is blended with the other dry ingredients in a bowl to which is added one cup (240 ml) of hot tap water. The water and the dry ingredients are stirred briskly until the dough becomes stiff and most of the flour has been mixed in. Then, with lightly floured hands, the dough is folded and turned in a bowl to pick up remaining flour mixture. The dough is then permitted to rest for 10 minutes. After mixing, a dough ball is formed and flattened to a dimension of 8 × 12 inches prior to rolling. The dough is then turned over and again flattened to a smooth sheet. Then starting at the shorter side of the rectangle, the dough sheet is rolled up tightly into a cylindrical form in the manner of a jelly roll. The free edge, along the length of the roll, is then sealed by pinching to form a seam. The rolled dough is placed on a greased cookie sheet, shaped into a long oval and covered with a dish towel and placed in a warm draft-free area (about 85° F.) for about 40 minutes to allow the dough to rise. In the meantime, the oven is preheated to 400° F. After the 40 minute proofing period, the towel is removed and the top of the dough is cut with three diagonals and wetted with an egg white glaze. The dough is then baked at 400° F. for about 30–35 minutes until the crust is golden brown. The resultant rye bread shows excellent grain and crumb structure.

The dry malt extract of Example 4 is a hygroscopic material which can cause lumping and caking, particularly in humid weather. In order to overcome this problem, the dry malt extract was incorporated into the rye flavoring of Example 3 along with some of the salt of the bread mix in Example 4, and the caraway, dill, fennel and onion flavorings were removed from the rye flavoring ingredients of Example 3 and incorporated into the bread ingredients of Example 4.

The new rye flavoring composition is somewhat similar to the rye flavoring set forth in Example 3 with a somewhat comparable taste. Making a rye bread from the new rye flavoring and the new rye bread mix yields a product identical to that of Example 4 but during its shelf-life it has no caking or lumping tendencies, even in hot humid weather. The following examples are set forth below as illustrative of the new rye flavor composition and the new rye bread mix.

EXAMPLE 5

Another rye flavoring has 78.52% medium rye flour (all percentages are based upon total weight of the rye flavoring). It is made by uniformly premixing, at room temperature, 60–90% of the rye flour with the dry components comprising: dry malt extract 14.74% and salt 2.0%; and separately mixing, at room temperature, the liquid components comprising:

| | |
|---|---|
| 2.21% | 80% Lactic Acid |
| 2.21% | 85% Phosphoric Acid |
| 0.21% | Glacial Acetic Acid |
| 0.11% | Propionic Acid |

The liquid acid flavorings comprise 4.74% by weight of the rye flavoring. When homogeneous, the liquid composition is sprayed at a pressure of 35 psi, at room temperature, through nozzle apertures of approximately 100 microns in diameter, into the premixed components while further mixing.

The mixture is ground, at room temperature, through a ⅛ inch coarse screen to produce uniform size rubbery pellets. During the grinding operation, the remaining rye flour (10–40% of the rye flour) is simultaneously and proportionally introduced into the grinder to dust the coarse ground material to prevent agglomeration.

The dusted material is permitted to set and equilibrate overnight (approximately 16 hours) and is then ground through a 1/16 inch mesh screen in a hammer mill. The ground product is mixed once again and then packaged for use in a bread mix.

The dry malt extract in Example 5 does not produce caking nor a lumpy mixture by virtue of its being coated or dusted with the rye flour mixture. Consequently, the rye flavoring of Example 5 is a fine, smooth pouring powder.

EXAMPLE 6

The procedure of Example 5 is followed to prepare the rye flavoring. To prepare a rye bread, the following ingredients are employed:

| Ingredients | % Based on Total Weight |
|---|---|
| High Gluten Flour | 80.26 |
| Salt | 2.18 |
| Sugar | 1.35 |
| Shortening | 1.35 |
| Sodium Stearoyl-2-Lactylate | 0.49 |
| Inactive Dry Yeast | 0.23 |
| Non-Fat Dry Milk | 1.83 |
| Quick-Leavening Active Dry Yeast | 2.23 |
| Caraway | 0.54 |
| Dill | 0.35 |
| Fennel | 0.037 |
| Onion | 0.005 |
| Rye Flavoring | 9.16 |
| | 100.00% |

The rye bread comprises 410 grams of the ingredients. The quick-leavening active dry yeast is blended with the other dry ingredients in a bowl to which is added one cup (240 ml) of hot tap water. The water and the dry ingredients are stirred briskly until the dough becomes stiff and most of the flour has been mixed in. Then, with lightly floured hands, the dough is folded and turned in a bowl to pick up remaining flour mixture. The dough is then permitted to rest for 10 minutes. After mixing, a dough ball is formed and flattened to a dimension of 8 × 12 inches prior to rolling. The dough is then turned over and again flattened to a smooth sheet. Then starting at the shorter side of the rectangle, the dough sheet is rolled up tightly into a cylindrical form in the manner of a jelly roll. The free edge, along the length of the roll, is then sealed by pinching to form a seam. The rolled dough is placed on a greased cookie sheet, shaped into a long oval and covered with a dish towel and placed in a warm draft-free area (about 85° F.) for about 40 minutes to allow the dough to rise. In the meantime, the oven is preheated to 400° F. After the 40 minute proofing period, the towel is removed and the top of the dough is cut with three diagonals and wetted with an egg white glaze. The dough is then baked at 400° F. for about 30–35 minutes until the crust is golden brown. The resultant rye bread shows excellent grain and crumb structure.

The rye flavoring of Example 5 contains ingredients in a percentage different from the rye flavoring of Example 3. Likewise, the dry rye bread mix of Example 6 has ingredients in different percentages than the dry rye bread of Example 4. Nevertheless, the rye bread mix of Example 4 and the rye bread mix of Example 6 contain the exact same amount of ingredients by weight.

What I claim is:

1. A method of making a lump free, dry rye flavoring having between 40–88% rye flour, 4–15% liquid acid flavorings and 8–45% dry flavorings by weight totaling 100% of the rye flavoring comprising:
   (a) premixing dry components, the dry components are the rye flour and the dry flavorings;
   (b) blending separately from the dry components the liquid acid flavorings;
   (c) spraying and mixing the blended liquid acid flavorings into the dry components to form an elastic composition;

(d) allowing the resultant elastic composition to set and dry into a hard consistency;

(e) grinding the resultant hard composition into a dry powder; and (f) mixing the dry powder composition to achieve a uniform rye flavoring powder.

2. The method of claim 1, wherein all the process steps are performed at room temperature.

3. The method of claim 1, wherein the dry flavorings comprise based on the weight of the rye flavoring:

| | |
|---|---|
| 15–40% | Salt |
| 4–10% | Caraway |
| 2.5–9% | Dill |
| 0.22–2% | Fennel |
| and 0.04–2.5% | Onion Powder. |

4. The method of claim 1, wherein the dry flavorings comprise based on the weight of the rye flavoring:

| | |
|---|---|
| 4–10% | Caraway |
| 2.5–9% | Dill |
| 0.22–2% | Fennel |
| 0.04–2.5% | Onion Powder. |

5. The method of claim 1, wherein the dry flavorings comprise based on the weight of the rye flavoring:

| | |
|---|---|
| 5–20% | Malt Extract |
| 1–5% | Salt. |

6. The method of claim 1, wherein the liquid acid flavorings comprise a member of a group consisting of 80% lactic acid, 85% phosphoric acid, glacial acetic acid, propionic acid, and mixtures of these.

7. The method of claim 6, wherein the liquid acid flavorings comprise at least one organic acid flavoring.

8. The method of claim 7, wherein liquid acid flavorings comprise, based on the weight of the rye flavoring:

| | |
|---|---|
| 2–10% | of 80% Lactic Acid |
| 2–8% | of 85% Phosphoric Acid |
| 0.1–1% | Glacial Acetic Acid |
| 0.1–0.4% | Propionic Acid. |

9. The method of claim 1, wherein step (d) the resultant composition is allowed to set for at least 8 hours.

10. A method of making a dry rye bread mix by employing a dry rye flavoring comprising 40–80% rye flour, 4–15% liquid acid flavorings and 8–45% dry flavorings by weight totaling 100% of the rye flavoring, comprising:

(a) premixing the dry components which comprise the rye flour and dry flavorings;

(b) blending separately from the dry components the liquid acid flavorings;

(c) spraying and mixing the blended liquid acid flavorings into the dry components to form an elastic composition;

(d) allowing the resultant elastic composition to set and dry into a hard consistency;

(e) grinding the resultant hard composition into a dry powder;

(f) mixing the composition to achieve a uniform rye flavoring powder; and (g) adding from 3–15% the rye flavoring powder of step (f) to a dry bread mix based on the total weight of rye flavoring and bread mix.

11. The method of claim 10, wherein all the process steps are performed at room temperature.

12. The method of claim 10, wherein the dry flavorings comprise based on the weight of the rye flavoring:

| | |
|---|---|
| 15–40% | Salt |
| 4–10% | Caraway |
| 2.5–9% | Dill |
| 0.22–2% | Fennel |
| and 0.04–2.5% | Onion Powder. |

13. The method of claim 10, wherein the dry flavorings comprise based on the weight of the rye flavoring:

| | |
|---|---|
| 4–10% | Caraway |
| 2.5–9% | Dill |
| 0.22–2% | Fennel |
| 0.04–2.5% | Onion Powder. |

14. The method of claim 10, wherein the dry flavorings comprise based on the weight of the rye flavoring:

| | |
|---|---|
| 5–20% | Malt Extract |
| 1–5% | Salt. |

15. The method of claim 10, wherein the liquid acid flavorings comprise a member of a group consisting of 80% lactic acid, 85% phosphoric acid, glacial acetic acid, propionic acid, and mixtures of these.

16. The method of claim 15, wherein liquid acid flavorings comprise at least one organic acid flavoring.

17. The method of claim 16, wherein liquid acid flavorings comprise, based on the weight of the rye flavoring:

| | |
|---|---|
| 2–10% | of 80% Lactic Acid |
| 2–8% | of 85% Phosphoric Acid |
| 0.1–1% | Glacial Acetic Acid |
| 0.1–0.4% | Propionic Acid. |

18. The method of claim 10, wherein step (d) the resultant composition is allowed to set for at least 8 hours.

19. A method of making a lump free, dry rye flavoring comprising 40–88% rye flour, 4–15% liquid acid flavorings and 8–45% dry flavorings by weight totaling 100% of the rye flavoring comprising:

(a) premixing dry components of 10–60% of the rye flour with the dry flavorings;

(b) blending separately from the dry components the liquid acid flavorings;

(c) spraying and mixing the blended liquid acid flavorings into the dry components to form a composition;

(d) grinding to a coarse state the resultant composition and dusting simultaneously the ground composition with the remaining rye flour;

(e) allowing the ground, dusted composition to set and dry into a hard consistency;

(f) grinding the composition of step (e) into a dry fine powder; and
(g) mixing the composition to achieve a uniform rye flavoring powder.

20. The method of claim 19, wherein all the process steps are perfomed at room temperature.

21. The method of claim 19, wherein the dry flavorings comprise based on the weight of the rye flavoring:

| | |
|---|---|
| 15–40% | Salt |
| 4–10% | Caraway |
| 2.5–9% | Dill |
| 0.22–2% | Fennel |
| and 0.04–2.5% | Onion Powder. |

22. The method of claim 19, wherein the dry flavorings comprise based on the weight of the rye flavoring:

| | |
|---|---|
| 4–10% | Caraway |
| 2.5–9% | Dill |
| 0.22–2% | Fennel |
| and 0.04–2.5% | Onion Powder. |

23. The method of claim 19, wherein the dry flavorings comprise based on the weight of the rye flavoring:

| | |
|---|---|
| 5–20% | Malt Extract |
| 1–5% | Salt. |

24. The method of claim 19, wherein the liquid acid flavorings comprise a member of a group consisting of 80% lactic acid, 85% phosphoric acid, glacial acetic acid, propionic acid, and mixtures of these.

25. The method of claim 24, wherein liquid acid flavorings comprise at least one organic acid flavoring.

26. The method of claim 25, wherein liqud acid flavorings comprise, based on the weight of the rye flavoring:

| | |
|---|---|
| 2–10% | of 80% Lactic Acid |
| 2–8% | of 85% Phosphoric Acid |
| 0.1–1% | Glacial Acetic Acid |
| 0.1–0.4% | Propionic Acid. |

27. The method of claim 19, wherein step (e) the resultant composition is allowed to set for at least 8 hours.

28. The method of claim 19, wherein the coarse grinding passes through a ⅛ inch screen.

29. The method of claim 19, wherein the fine powder of step (f) passes through a 100 mesh screen.

30. A method of making a dry rye bread mix by employing a dry rye flavoring comprising 40–88% rye flour, 4–15% liquid acid flavorings and 8–45% dry flavorings by weight totaling 100% of the rye flavoring, comprising:
(a) premixing dry components 60–90% of the rye flour with the dry flavorings;
(b) blending separately from the dry components the liquid acid flavorings;
(c) spraying and mixing the blended liquid acid flavorings into the dry components to form a composition;
(d) grinding to a coarse state the resultant composition and dusting simultaneously the ground composition with the remaining rye flour;
(e) allowing the ground, dusted composition to set and dry into a hard consistency;
(f) grinding the hard composition of step (e) into a dry fine powder;
(g) mixing the composition to achieve a uniform rye flavoring powder; and
(h) adding from 3–15% the rye flavoring powder of step (g) to a dry bread mix based on the total weight of rye flavoring and bread mix.

31. The method of claim 30, wherein all the process steps are performed at room temperature.

32. The method of claim 30, wherein the dry flavorings comprise based on the weight of the rye flavoring:

| | |
|---|---|
| 15–40% | Salt |
| 4–10% | Caraway |
| 2.5–9% | Dill |
| 0.22–2% | Fennel |
| and 0.04–2.5% | Onion Powder. |

33. The method of claim 30, wherein the dry flavorings comprise based on the weight of the rye flavoring:

| | |
|---|---|
| 4–10% | Caraway |
| 2.5–9% | Dill |
| 0.22–2% | Fennel |
| 0.04–2.5% | Onion Powder. |

34. The method of claim 30, wherein the dry flavorings comprise based on the weight of the rye flavoring:

| | |
|---|---|
| 5–20% | Malt Extract |
| 1–5% | Salt. |

35. The method of claim 30, wherein the liquid acid flavorings comprise a member of a group consisting of 80% lactic acid, 85% phosphoric acid, glacial acetic acid, propionic acid, and mixtures of these.

36. The method of claim 35, wherein liquid acid flavorings comprise at least one organic acid flavoring.

37. The method of claim 36, wherein liquid acid flavorings comprise, based on the weight of the rye flavoring:

| | |
|---|---|
| 2–10% | of 80% Lactic Acid |
| 2–8% | of 85% Phosphoric Acid |
| 0.1–1% | Glacial Acetic Acid |
| 0.1–0.4% | Propionic Acid. |

38. The method of claim 30, wherein step (e) the resultant composition is allowed to set for at least 8 hours.

* * * * *